(12) United States Patent
Bejerano et al.

(10) Patent No.: US 8,634,329 B2
(45) Date of Patent: Jan. 21, 2014

(54) METHOD FOR IMPROVED TOPOLOGY MAPPING IN WIRELESS COMMUNICATION NETWORKS

(75) Inventors: Yigal Bejerano, Springfield, NJ (US); Thyagarajan Nandagopal, Edison, NJ (US); Katherine H. Guo, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 537 days.

(21) Appl. No.: 13/017,206

(22) Filed: Jan. 31, 2011

(65) Prior Publication Data

US 2012/0195228 A1 Aug. 2, 2012

(51) Int. Cl.
*H04W 84/18* (2009.01)

(52) U.S. Cl.
USPC ............................ 370/254; 370/400; 709/224

(58) Field of Classification Search
None
See application file for complete search history.

(56) References Cited

U.S. PATENT DOCUMENTS

| | | | |
|---|---|---|---|
| 7,035,240 B1 * | 4/2006 | Balakrishnan et al. ....... | 370/338 |
| 7,660,319 B2 | 2/2010 | Kobayashi et al. | |
| 7,688,846 B2 | 3/2010 | Calcev et al. | |
| 2005/0117530 A1 * | 6/2005 | Abraham et al. ............. | 370/310 |
| 2007/0047510 A1 * | 3/2007 | Cho et al. ...................... | 370/338 |
| 2009/0034432 A1 * | 2/2009 | Bonta et al. ................... | 370/255 |
| 2009/0262689 A1 * | 10/2009 | Jeong et al. .................... | 370/329 |
| 2010/0074133 A1 * | 3/2010 | Kim et al. ...................... | 370/252 |
| 2010/0295659 A1 | 11/2010 | Kodialam et al. | |
| 2011/0055424 A1 * | 3/2011 | Jiang et al. .................... | 709/238 |

OTHER PUBLICATIONS

R. RoyChoudhury et al, "A Distributed Mechanism for Topology Discovery in Ad Hoc Wireless Networks Using Mobile Agents," ACM MobiHoc '00 Proceedings of the 1st ACM international symposium on Mobile ad hoc networking & computing, pp. 145-146, 2000.
A. Ahmed Abbasi et al, "A survey on clustering algorithms for wireless sensor networks," Computer Communications 30, 2007, pp. 2826-2841.
S. Vasudevan et al, "Neighbor Discovery in Wireless Networks and the Coupon Collector's Problem", ACM MobiCom '09, Sep. 20-25, 2009, Beijing, China, 12 pages.
A. Youssef et al, "Distributed Formation of Overlapping Multi-hop Clusters in Wireless Sensor Networks," Proceedings of the Global Telecommunications Conference, 2006. Globecom '06, San Francisco, CA. Nov. 27-Dec. 1, 2006, 6 pages.
R. Sivakumar et al, "CEDAR: a Core-Extraction Distributed Ad hoc Routing algorithm" IEEE Journal on Selected Areas in Communication, vol. 17, No. 8, Aug. 1999, pp. 1-12.
D. Dubhashi et al, "Fast Distributed Algorithms for (Weakly) Connected Dominating Sets and Linear-Size Skeletons", SODA '03 Proceedings of the fourteenth annual ACM-SIAM Symposium of Discrete Algorithms, Philadelphia, PA, 2003, pp. 717-724.
M. Kodialam et al, "Identifying RFID Tag Categories in Linear Time," WiOPT '09 Proceedings of the 7th international conference on Modeling and Optimization in Mobile, Ad Hoc, and Wireless Networks, IEEE Press Piscataway, NJ, 2009, 6 pages.

(Continued)

*Primary Examiner* — Hassan Phillips
*Assistant Examiner* — Duc Duong (57) ABSTRACT

A method is provided for enabling a base station to infer a compact topology graph among a set of mobile nodes in its cell, the mobile nodes having a secondary radio to enable inter-nodal communication. This methodology ensures that nodal membership information is gathered within approximately 100 ms, and additional topology information is gathered from all the mobile nodes within approximately 300 ms over Wi-Fi radios. In dense networks, this time can be reduced to within 100 ms.

20 Claims, 4 Drawing Sheets

(56) References Cited

OTHER PUBLICATIONS

I.A. Kanj et al, "Improved Stretch Factor for Bounded-Degree Planar Power Spanners of Wireless Ad-Hoc Networks," Proc. ALGOSENSORS, 2006, pp. 95-106.

B. O'Hara and A. Petrick, "The IEEE 802.11 Handbook: A Designer's Companion," published by Standards Information Network, IEEE Press, copyright year: 1999, cover, title page, pp. ii-xiv, 1-174.

* cited by examiner

NETWORK GRAPH G

CTG₁

CTG₂

CTG₃

FIG. 3

THE CIRCLED SLOTS ARE THE UNIQUE SLOTS IN WHICH ONLY ONE
NODE TRANSMITS, THOUGH CH $x$ DOES NOT KNOW THAT

FIG. 4

METHOD FOR IMPROVED TOPOLOGY MAPPING IN WIRELESS COMMUNICATION NETWORKS

FIELD OF THE INVENTION

The present invention generally relates to nodal mapping in a wireless communications system.

BACKGROUND OF THE INVENTION

Contemporary wireless communication systems are characterized by multiple radio access technologies, some of which result from an evolution of successive generations of cellular communications services and some of which represent wireless communication services that have developed outside the conventional cellular paradigm. Examples of the former include Universal Mobile Telecommunications System (UMTS) and Long Term Evolution (LTE), while 802.11 services such as Wi-Fi exemplify the latter. A multi-mode user terminal (hereafter usually referred to as a mobile node) having RF capabilities compatible with two or more radio access technologies can switch to an available technology that is most suitable at the relevant time. This provides advantages for both the user—who may be able to access a network operating with a given technology at a given time, but not a network for the other technology supported by the user's terminal, and the system operator operating with multiple technologies in its network—which will often be able to do load-sharing between different technology carriers, so as to improve network usage and performance.

At least for the case of user terminals supporting access with both a conventional cellular system and with an 802.11 system, the aggregate available network may be characterized as implementing a hybrid cellular architecture. An advantage of hybrid cellular architectures lies in the ability of end-user devices to assist the base station (BS) in various functions by acting as content caches, cell relays, aggregators, mobility predictors, and the like. In a hybrid architecture, the key differentiator is that the base station knows the location of a given mobile node (MN) as well as that of its neighbors. This location information supports the determination by the base station of the topology of a network formed by the mobile nodes using their secondary radio (generally, the radio supporting access to an 802.11 system). Availability of this topology information is vital for the base station in order to fully exploit the potential benefits of a hybrid architecture.

Although procedures for discovery of topology information by mobile nodes in a cell is generally known in the art, the conventional focus has been on how each node discovers the entire network connectivity graph. In a hybrid model, the base station has to know the topology of the underlying network graph among its served MNs. However, the base station does not necessarily need to know the entire set of links among all of the served MNs. For example, the base station might be interested in knowing only the high-quality links between the served MNs, or it might be interested in knowing only if there exists at least one path between those MNs, etc. Many of these functions may be addressed without knowledge of the entire topology of the MN network. The reduced topology so needed is referred to herein as a compact topology graph (CTG).

Another issue is that, while topology discovery can happen in a distributed manner for an ad-hoc wireless network, in the case of a hybrid network, the process is centralized in nature with all mobile nodes informing a single destination (i.e., base station) about their neighbors. This can result in excessive transmission overhead.

In modern cellular data networks, communication from the MN to the base station involves some signaling to acquire a bearer channel and once the bearer is acquired, transmission of data over the bearer. For a typical cell with hundreds of users, doing the above solely for the purpose of topology discovery can become a significant bottleneck.

A typical manner in which this resource constraint can be relaxed is by use of clustering, wherein groups of MNs organize themselves into clusters and elect a cluster-head (CH), with each CH discovering the cluster topology and communicating this to the base station. Thus, the signaling overhead is proportional to the number of CHs, while the data transmitted is at most the same as before. In principle, each CH performs at least one of the functions: (a) identify the membership information for each cluster, or (b) identify the topology of the cluster. However, the methods of the art carry out such functions in a sub-optimal way.

SUMMARY OF INVENTION

The invention provides novel methods to perform both of the above-described CH functions. Specifically, the invention provides a method for communicating a compact topology representation of the underlying network graph formed by the secondary radios of the MNs to the base station in a fast and efficient manner.

In an embodiment of the invention, a fast algorithm is provided that allows the base station to infer the compact topology among the mobile nodes with a secondary radio in its cell. This methodology ensures that membership information is gathered within approximately 100 ms, and additional topology information is gathered from all the mobile nodes within approximately 300 ms over Wi-Fi radios. In dense networks, this time can be reduced to within 100 ms.

In a further embodiment, the base station can obtain the topology of the network without any mobile node revealing its identity to any other mobile node. This has significant implications regarding the privacy of mobile nodes.

BRIEF DESCRIPTION OF THE FIGURES

The teachings of the present invention can be readily understood by considering the following detailed description in conjunction with the accompanying drawings, in which.

DETAILED DESCRIPTION

In the following description, for purposes of explanation and not limitation; specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of a methodology for determining a compact topology representation for a network of mobile nodes. While the disclosed invention is illustratively described in terms of mobile nodes having dual radio access to a cellular wireless communication system such as LTE or High Speed Packet Access (HSPA) and to an 802.11 system such as Wi-Fi, it should be readily apparent that the inventive concept is applicable to networks of mobile nodes having either dual radio access to other wireless system combinations or to mobile nodes having only single radio access to 802.11 systems.

Figure 1:
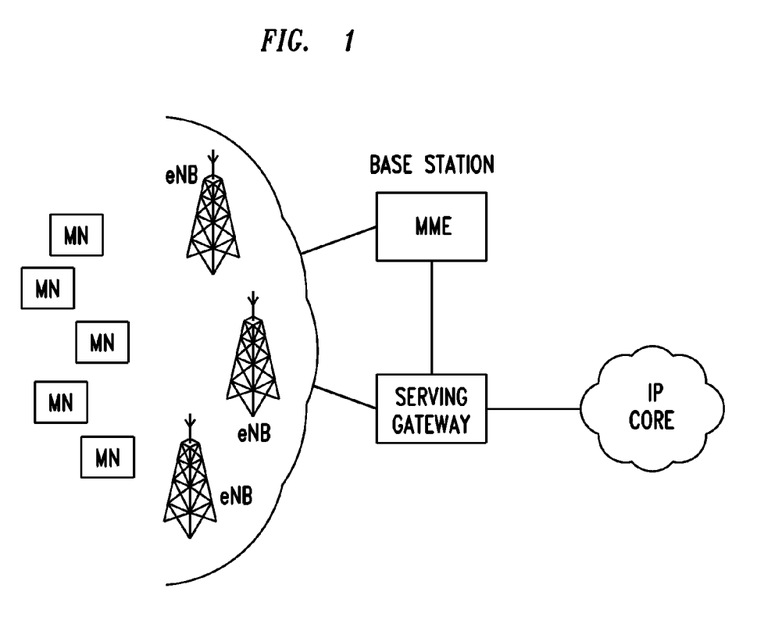
FIG. 1 provides a schematic depiction of a a wireless system arrangement in which the method of the invention may be implemented.

As a predicate to a detailed description of the methodology of the invention, consider the cellular data network shown in FIG. 1, which illustratively may be implemented according to LTE or HSPA standards. There are multiple cells in the network, each accessed via the equivalent of a base station, which in the case of the illustrative LTE/HSPA network is designated as an eNodeB (eNB). The eNBs are connected via a signaling path to a Mobility Management Entity (MME), and via a data path to the Serving Gateway (SGW). The eNBs are controlled by the MME/SGW pair, and a single MME/SGW complex generally represents a large geographic area, with scores of cells. When a Mobile Node (MN) enters the network, it first registers itself with the MME (via an appropriate one of the eNBs), and establishes a control channel with it. When the MN sends data, it must first signal the eNB to acquire a bearer channel for sending data. The eNB (or another network entity) assigns the bearer, and informs the MN about the bearer channel. This process can take as long as 100 ms in LTE and up to 2 seconds in HSPA networks. For purposes of the description herein, the MME/SGW pair will be referred to as a Base Station, since they act as a single logical entity for both the control and data path for MNs, and also since they provided the functional equivalent of an access point for a single 802.11 cell such as a wireless local area network (WLAN) cell.

As described above, the MNs are configured as multi-mode terminals having at least two radios, one used to talk to a base station of the cellular network, and the other as a secondary radio for access to an 802.11 network such as Wi-Fi or WiMAX. It is assumed for purpose of the description herein that the secondary radio is a Wi-Fi radio adhering to the IEEE 802.11 family of standards, but it should be understood that the inventive concept is not so limited. Mobile nodes are able to use this secondary radio to communicate with a Wi-Fi access point, or among themselves. As such, the mobile nodes are considered to be in a peer-to-peer mode.

Each Base Station controls hundreds of MNs at any given time, and knows the identities of all the MNs since they have to register with the network to receive service. However, the Base Station has only limited information regarding the relative position of an MN with respect to other nodes in its cell. Techniques such as Assisted GPS (A-GPS) or plain GPS may be used to place the user at a geographical location on a map, but cannot guarantee that two nodes that are nearby (to one another) can talk to each other. In order to do this, the Base Station has to rely on the MNs to gather and provide this information.

The term "link" refers herein to the Wi-Fi link between two MNs. Note also that the terms "node", "mobile" and "MN" are used inter-changeably in the discussion herein.

The link between two nodes is symmetric. Each node is uniquely identified by an ID composed of the International Mobile Equipment Identity (MEI) and the Wi-Fi MAC address. The Base Station is aware of the Wi-Fi MAC addresses of all the mobiles, obtaining them during registration. The Base Station is capable of sending a broadcast message to all of the mobiles via a control channel (e.g. the BCCCH channel in HSPA and LTE). The Base Station also provides timing signals to synchronize all the mobiles, thus allowing the mobiles to operate without explicit synchronization over the Wi-Fi interface.

There are a total of N nodes in the system, and the density of nodes is denoted by $\rho$. The interference range is assumed to be at most twice the data range. The invention methodology does not require that the nodes to be distributed uniformly, nor that a given node can hear all other nodes, i.e., there is no assumption of a clique.

Figure 2:
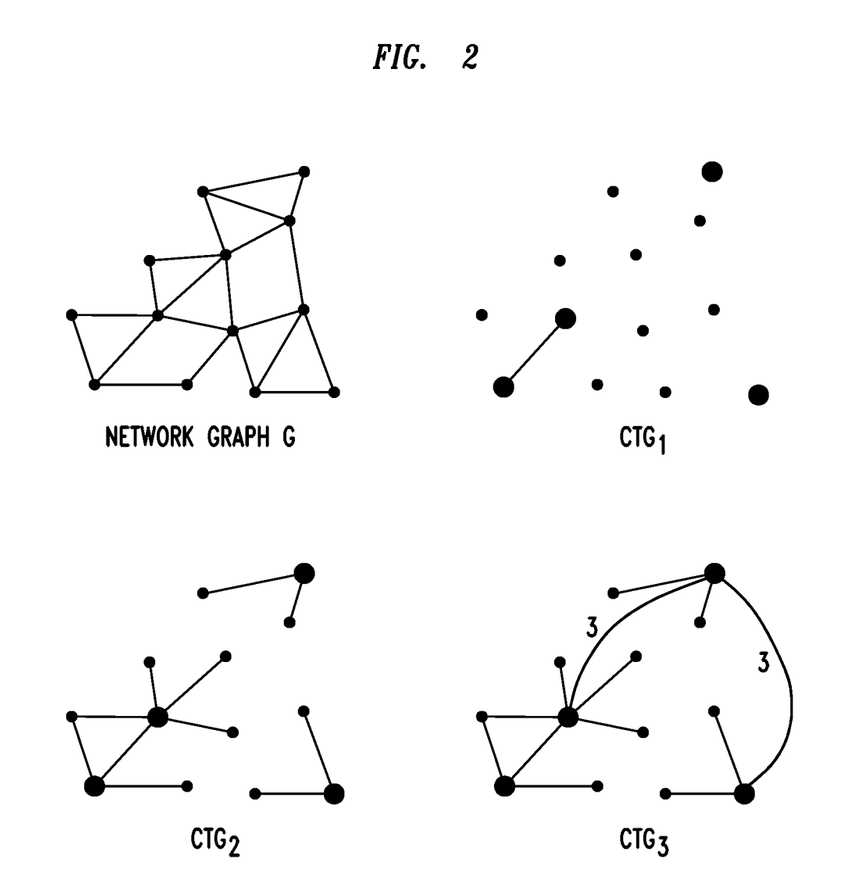
FIG. 2 depicts illustrative compact topology graphs for a given nodal network.

For purposes of the invention description, the notion of a Compact Topology Graph is defined herein. Let the set of mobile nodes be represented as a set of vertices, V, of a network graph, G=(V; E). The set of links between MNs is represented as the set of edges, E, between the corresponding vertices of this graph. $uv|uv \in E$, $v \in X$ A Compact Topology Graph, $CTG_i(G)=(V, E_i)$, I=1, 2, 3, is defined as a weighted sub-graph of G. The node set V is split into two sets, X, Y, where X is a dominating set (DS) of G, and Y=V\X. (A set X of nodes is a dominating set of a graph G, if all nodes in the graph are either in the set X or neighbors of some node in X.) The set X is chosen to be a DS of G, which implies that Y is the set of non-dominating nodes of G that have a node in the dominating set as their neighbor. In addition, for each node, $v \in X$, $H_1(v)=\{u|uv \in E\}$ are defined to be the one-hop neighbors of v and $H_2v=\{u|u \in H_1(v), \exists w \in H_1(v)$ s.t. $uw \in E\}$. In other words, $H_1(v)$ and $H_2(v)$ represent the one-hop and two-hop neighbors of a node $v \in X$.

The sets $E_1$; $E_2$ and $E_3$ are defined as:

$$E_1 = \{uv|uv \in E, u, v \in X\}$$

$$E_2 = E_1 \cup \{uv|uv \in E, u \in X, v \in Y\}$$

$$E_3 = E_2 \cup \{u, v \in X \text{ and } h_G(u,v)=3\}$$

Edges in the sets $E_1$ and $E_2$ have a weight of 1, while edges in the set $E_3 \setminus E_2$ have a weight of 3, representing the minimum hop count between the end-points of the links.

Examples of $CTG_2$ and $CTG_3$ for a graph G are shown in FIG. 2. Notice that $CTG_2$ is not a weakly connected dominating set (WCDS) of G. If the original graph G is disconnected, then the $CTG_i$ are also disconnected.

The dominating set, X, is established by means of a clustering algorithm, where nodes elect a representative node in their neighborhood as their Cluster-Head (CH). This CH is also a dominator (i.e., a member of the DS) and is 1, 2, or 3 hops away from another dominator. If the set of dominating nodes can determine the paths to their nearest dominators, and add the nodes and links on these paths, one can then build a CTG of the underlying network graph G.

It was noted above that the process of obtaining a bearer channel from an MN to the Base Station involves at least a 100 ms delay on a per-MN basis. If each node in G, were to attempt to communicate its topology information on a per-node basis, contending to obtain access to the control channel alone could easily take a few seconds, without even being bandwidth-intensive, tying up resources on the Base Station. Therefore, an objective is to rely on the CHs to transfer the relevant information to the Base Stations. Since the number of CHs is typically an order of magnitude smaller than the number of MNs in the network, the communication overhead will be expected to be much smaller with this approach. As a result, the construction of $CTG_i(G)$ at the Base Station will proceed much faster.

As part of the invention methodology, the inventors have developed a fast and efficient algorithm that obtains the CTG of the network graph. To make the presentation simpler for the illustrative embodiment described herein, any transmission by a node is assumed to be on the Wi-Fi interface, unless explicitly mentioned otherwise. It should be understood, however, that the intended scope of the invention methodology is not limited to such a Wi-Fi application.

The algorithm of the invention is divided into two components: (a) topology discovery and (b) topology construction. In order to avoid disruption of existing traffic on the Wi-Fi links, there is a need to keep the former as small in duration as possible. It is also desirable to avoid variability in the duration of discovery.

The algorithm of the invention runs in four phases, where the first three are for topology discovery and the last one is the topology construction phase. All phases are of a fixed duration, determined by the density of mobiles. At the beginning of the algorithm, the Base Station sends a broadcast message to all nodes with the lengths of the first three phases (W, k and k), a value d, a random seed R, and its choice of discovering either $CTG_2$ or $CTG_3$.

The first phase is directed to Cluster Head selection (characterized as phase $Z_0$), and is W slots long, with each slot equal to a back-off slot in 802.11. Nodes volunteer to act as the CHs for their neighbors following a probabilistic scheme. In this phase, each node sends at most one broadcast message, without knowing the size of its neighborhood. Each node completes this phase when one of two actions occurs: (a) the node transmits, or (b) the node overhears another transmission, whichever happens first.

Note that, while transmissions can collide in this phase, the process is essentially terminated at each node as soon as the first transmission occurs in its neighborhood. Each node that transmitted assumes the role of a CH, while the nodes that overhear a transmission (success or collision) become non-CH nodes. The CH node notes down the slot number in which it transmitted.

Figure 3:
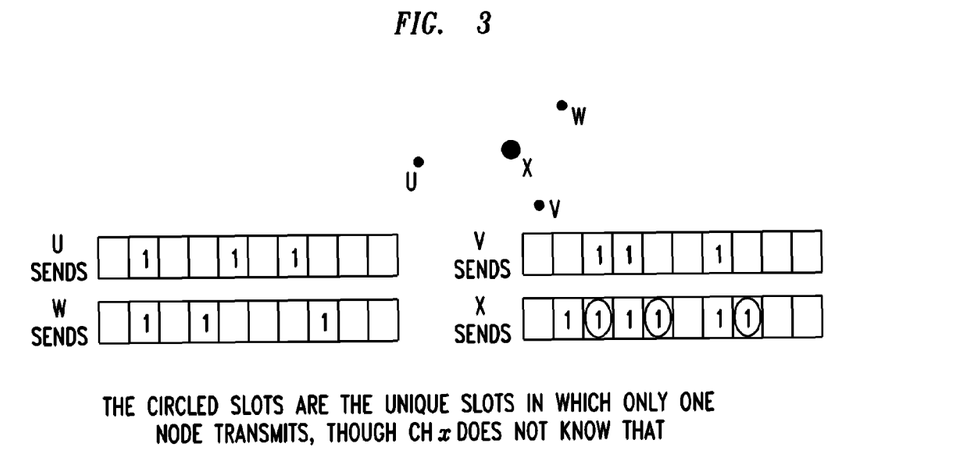
FIG. 3 provides a schematic representation of nodal transmission slots determined according to the method of the invention.

The second phase carried out by the algorithm is directed to obtaining a one-hop neighbor list (characterized as phase $Z_1$). At the end of Phase 1, each non-CH node will send out its identity in a unique signature following an approach developed by one of the inventors (and others) in a prior work directed to communication with RFID tags. That approach is described in detail in US Published Patent Application No. 2010/0295659, but is summarized here in sufficient detail for an understanding of the invention here. According to that approach, each non-CH node transmits up to d times in a window K of length k slots, where k and d are provided by the Base Station. In each slot, the non-CH node transmits 1 PHY symbol worth of bits. The selection of d slots is based on a random hash of a seed value provided by the BS and the ID (MAC or IMEI) of the node. The idea is to ensure that there exists at least one slot where each node can transmit without any collisions from neighboring nodes in that slot. The values of k and d are chosen such that all nodes in a two-hop neighborhood have at least one slot where they will be the only node transmitting, with high probability of being successfully received. This is illustrated in FIG. 3.

Each CH node listens to the transmissions of all of its non-CH neighbors. In each slot, the CH node detects the energy of the overall transmission, and determines if there is at least one transmission in this slot or not based on an energy threshold. Since the received bits are not actually decoded, interference from non-neighboring nodes is not an issue. The CH logs which slots had a transmission and which ones did not as a binary bit vector of length k, and stores it as digest, $\psi_1$, which is intended as an encoding of all the neighbors of a CH. This idea is explained in detail below.

At this point, one has enough data from the yr, information to obtain the $CTG_2$ sub-graph, and the topology construction for that development is described below in respect to the description of phase 4 of the algorithm. However, if the $CTG_3$ subgraph is needed, additional procedures are needed, as described immediately below.

As described before, in a window K of k slots, each non-CH node transmits up to d times. In order to obtain only the $CTG_2$ sub-graph, each slot lasts for a duration equivalent to a PHY symbol length, and a node simply transmits a symbol in its d slots and stays idle in the others. For determining the $CTG_3$ sub-graph, however, non-CH nodes in the $Z_1$ phase switch between transmission and reception modes. Therefore, the slot duration for non-CH nodes is Short Interframe Space (SIFS)+1 symbol length (e.g. 20 μs for 802.11a/g and 17 μs for 802.11b). At the beginning of the frame all non-CH nodes act as receivers. If, in a slot, a non-CH node has to transmit, it will switch to transmit mode in the SIFS interval, send a symbol and return to receive mode. In all other slots, a non-CH node will listen to broadcasts from its neighbors in the same manner as a CH described above. It will detect a sequence of transmitted slots (including its own) and idle slots, and record it as a bit vector, φ, which is intended as an encoding all of the neighboring nodes of this non-CH node.

It is important to note that this entire phase lasts exactly k slots throughout the network and happens in a distributed manner.

The third phase carried out by the algorithm is directed to obtaining a two-hop neighbor list (characterized as phase $Z_2$). At the end of phase $Z_1$, all nodes start phase $Z_2$ that enables CHs to construct their two-hop neighborhood. This phase lasts exactly k slots as well, except that each slot is only the duration of a data symbol (i.e., 4 μs in 802.11a/g). In this phase, each non-CH node transmits its φ vector as a single message in this phase. A "1" in the bit vector corresponds to a PHY data symbol of all 1s, while a "0" in the bit vector corresponds to no transmissions. The CH node listens to the coordinated transmissions of all of its neighbors. In the same manner as above, it then records the presence of a signal in each slot as a "1", and the absence as a "0". This bit vector of length k is called the $\psi_2$ digest.

At the end of receiving k symbols at each CH node, this phase is complete. Each non-CH node broadcasts exactly once (and in parallel) in this phase.

Phase 4 is directed to building the CTG sub-graph at the Base Station (characterized as phase $Z_3$). It is important to point out that no MN has transmitted anything to the Base Station until now. The topology discovery process ends at the $Z_1$ phase for $CTG_2$ and at the $Z_2$ phase for the $CTG_3$ sub-graphs. All that remains is for the Base Station to use this information to construct the CTG of the network graph, G.

At the end of the previous phase, each CH node sends the following information to the Base Station: (a) its identifier, (b) the slot number in which it transmitted in phase $Z_0$, (c) the $\psi_1$ digest obtained in phase $Z_1$, and (d) if $CTG_3$ construction is requested, the $\psi_2$ digest obtained in phase $Z_2$. Since the Base Station knows the set of all MNs in the network, it can pre-compute the exact set of d, slots in which each MN would have transmitted in the $Z_1$ phase. This is characterized herein as the node signature. The process of decoding a node is simply one of looking at the signature of each of the N nodes registered at the Base Station, and doing a bit-wise AND operation of this digest with $\psi_1(v)$ and $\psi_2(v)$. If the result is the signature of a node, then the node is marked as present in $H_1(v)$ and $H_1(v) \cup H_2(v)$ respectively, where $H_1$ and $H_2$ are as defined above. After the $\psi_1$ and $\psi_2$ vectors are decoded for all the nodes N, then the $H_2(v)$ can be computed by removing $H_1(v)$ from the latter set. Using this, the $CTG_2$ and $CTG_3$ sub-graphs can be computed.

Additional details respecting the methodology of the invention are presented in the sections following.

Cluster Head Selection—$Z_0$

At the beginning of the 4 phase, the Base Station sends a synchronization signal to all nodes to initiate the CH selection process. The Base Station sends a random seed, R, that is used in conjunction with the node ID by each node to initialize its random seed generator. Each node $u \in V$ now selects a slot randomly (from a uniform distribution) in a frame of length W. The nodes listen to the channel until their slot time arrives. If their slot arrives, they transmit a random string as 1 PHY symbol, and assume the role of a CH. The transmitting node might collide with other nodes transmitting in this slot, but they ignore it, and all nodes that collide in this slot will assume the role of a CH.

Nodes that overhear a transmission assume that some other node in their one-hop neighborhood has become a CH, and therefore terminate their selection algorithm, without knowing who their CH is. This is true even if the node overhears a collision. A unique part of the topology discovery process of the invention methodology is that a node never needs to know its CH, ever, unless the CH or the Base Station chooses to make this knowledge available to the node. This allows a non-CH node to be adjacent to multiple CHs within its range.

Interference Range: An MN could overhear cumulative interference from some nodes outside its range and assume that it has a CH in its neighborhood. In an embodiment of the invention, the existence of such interfering signals may be addressed by the establishment at a node of an energy threshold for detecting a valid signal. Thus, if the received signal strength for a signal heard by the node is above a certain threshold, then the signal is declared to be from a neighboring node. This measurement is available in existing Wi-Fi chip sets, and can be leveraged to combat the issue of interference from nodes further away.

Maintenance of CH node: If the topology is largely unchanged, then it may be preferable for the Base Station to use the same set of nodes as CHs, and have the topology discovery process repeat itself. The use of a random seed, R, provided by the Base Station assists this process. Accordingly, as long as the topology remains unchanged (i.e., no new nodes come into the network, no existing nodes leave, no mobility among the nodes), the same nodes are guaranteed to become the CHs again. If the Base Station wants a different set of CHs, then it can simply change the random seed, R, to get a different set.

Discovering One-Hop Neighbors, $Z_1$

As described previously, at the end of the $Z_0$ Phase, each non-CH node will send out its identity in a unique signature following an approach described in the prior section, that approach based on transmission by a node up to d times in a window of length k slots. In the $Z_1$ phase, the Base Station specifies if it wants to find $CTG_2$ or $CTG_3$, and specifies k and d, based on its estimated user density. Non-CH nodes use the random seed R provided by the Base Station earlier along with their ID to select the d slots at random from the frame of size k. Each non-CH node transmits an 802.11 PHY symbol worth of random data in each of the d slots that it selects. Note that this symbol can be transmitted without the need for any preamble, as it does not affect the synchronization of the signal at the receivers. Indeed, as the node does not need to decode the received signal, the question of synchronization is moot.

The CHs simply listen to each slot and record if there has been a transmission by at least one of the neighbors in this slot or not. Again, the CHs only need to have the received signal exceed a threshold to mark this slot as occupied. If not, they mark this slot as empty. This allows the CHs to record the one-hop neighborhood in the bit vector $\psi_1$ as described previously.

The behavior of non-CH nodes differs based on whether the Base Station wants to discover $CTG_2$ or $CTG_3$. For the former, the non-CH nodes merely act as transmitters, which allows the slot lengths to be 1 PHY symbol wide. In order to ensure bit integrity, an additional 1 µs guard duration can be added between slots. This adds nearly 4 ms to the duration but avoids bit-synchronization errors due to propagation delays at the CHs.

If $CTG_3$ is needed, then the non-CH nodes have to switch between their roles as transmitters and receivers. This is because, in order to obtain $CTG_3$, each CH node u needs to obtain its 2-hop neighborhood $H_2(u)$. This implies that non-CH nodes in $H_1(u)$ need to know their 1-hop neighborhood so that they can relay this to node u. They also need to listen to which slots their neighbors are selecting. Therefore, each slot is split into two parts: (a) SIFS duration that allows a node that is in transmitting mode to switch to receiving mode and vice versa, and (b) PHY symbol duration where the non-CH nodes transmit/listen. The resultant bit-vector recorded at a non-CH node v is called $\phi(v)$. In this bit-vector, the d slots selected by v are also marked as 1s.

Discovering Two-Hop Neighbors, $Z_2$

In the second phase, each non-CH node v sends out $\phi(v)$, in the same manner as they do in Phase $Z_1$ for discovering $CTG_2$. Each 1-bit in $\phi(v)$ translates to a data symbol, and a 0-bit is marked by absence of transmission, with a 1 µs guard duration between processing each bit in the digest. When a CH overhears this information, it is hearing from all of its 1-hop neighbors broadcasting their $\phi$ digests. In each slot of the window K, if it detects a transmission, a CH node marks the bit corresponding to this slot as a 1 in the $\psi_2$ digest, and if there is no transmission, then it marks it as a 0 bit.

Computing CTG, $Z_3$

In this phase, the Base Station obtains $\psi_1$; $\psi_2$ as well as the transmitted slot number in phase $Z_0$ from each CH node.

Constructing $CTG_1(G)$: The methodology first finds those CHs that are adjacent. These are nodes that would have collided in the first transmission slot in phase $Z_0$. They are identified by looking up pairs u, $v \in X$ that have the same tx-slot number in $Z_0$, and compare them bit wise AND of their $\psi_1$ vectors. As long as the neighborhood of two nodes is not sparse, there will be a significant overlap among the $H_1$ sets represented by these two vectors. These two nodes are considered to be neighbors in $CTG_1$, with high probability, if $\psi_1(u)$ differs from $\psi_1(v)$ in at most b much less than d bit positions.

Constructing $CTG_2(G)$: In the construction of the $CTG_2$ graph, the $CTG_1$ graph is augmented with more edges. First, the Base Station does a bitwise AND operation on a node's signature and the $\psi_1$ digest sent by a CH to see if this signature is contained in the digest. The process is very much similar to a Bloom filter. If a node is identified positively (i.e., the AND operation is nonzero), then it is added to the one-hop neighborhood of the CH node. This is done iteratively until all N nodes' signatures have been matched against all the digests provided by the CHs. All the CHs (i.e., those that send the digests to the Base Station) are denoted by the set X, and the one-hop neighborhood sets computed thus are denoted by $H_1(u) \forall u \in X \subset V$. An edge is drawn from $u \in X$ to all nodes in $H_1(u)$ to get $CTG_2$. If two CHs u, $v \in X$ have a node in $H_1(u) \cap H_1(v)$, then they will be connected in the $CTG_2$ sub-graph.

Constructing $CTG_3(G)$: In order to construct $CTG_3$, the Base Station needs to find all pairs of CH nodes who are separated by a distance of 3 in G. By adding an edge of weight 3 to these two nodes in $CTG_2$, $CTG_3$ is created.

The $CTG_3$ construction is started by setting $CTG_3 = 2$. The Base Station now computes the two-hop non-CH neighborhood $H_2(u)$, $\forall u \in X$ by decoding the $\psi_2$ digests sent by u. It is known that these represent $H_1(u) \cup H_2(U)$. The same method as before is applied of comparing each MN's signature against the digest to see if it is present. From this $H_2(u)$, $\forall u \in X$ can be computed.

Figure 4:
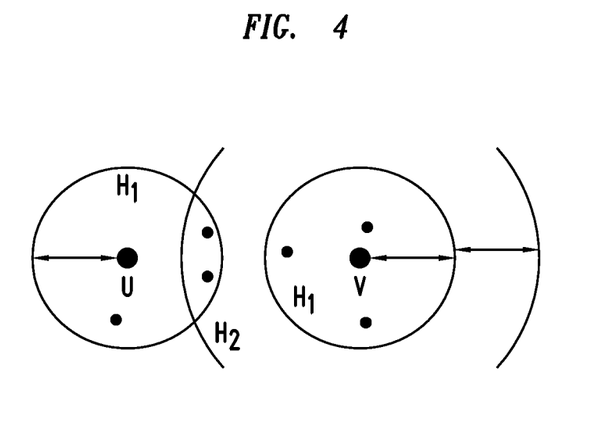
FIG. 4 provides a nodal representation for computation of a compact topology graph according to the method of the invention.

For any two nodes, u, $v \in X$ that are not connected in $CTG_2$, the Base Station knows $H_1(u)$, $H_2(v)$. It now computes $H_1(u) \cap H_2(v)$ to find those nodes which are two hops away from v but only one hop away from u. This is illustrated in FIG. 4. If there exists at least one node satisfying this, then it implies that $h_G(u, v) = 3$, and therefore an edge of weight 3 is added to the CTG sub-graph. Repeating this for all disconnected pairs of nodes in $CTG_2$ completes the construction.

Computing the 3-Hop Paths

For two nodes u, $v \in X$ with an edge of weight 3 between them in $CTG_3$, there exists a shortest path of 3 hops between them in G. Identification by the Base Station of at least one specific path between u and v is addressed hereafter.

The Base Station knows that there exists a node $x \in H_1(u) \cap H_2(v)$ and node $y \in H_2(u) \cap H_1(v)$, such that there is a u - - - x - - - y - - - v path in G. The Base Station looks at a node x in $H_1(u) \cap H_2(v)$, whose identity is known to it. The Base Station looks at node x's signature, as well as the signatures of all the nodes represented in $\psi_2(v)$ to find out which bit of $\psi_2(v)$ uniquely represents x. Since x can be decoded from $\psi_2(v)$, the existence of at least one such bit is guaranteed. The Base Station informs node v of this slot number. The CH node v then broadcasts this slot number to its neighbors and asks if any node in $H_1(v)$ has a bit corresponding to this slot set in their $\phi$ vector. Assuming that the topology has not changed, there exists at least one such node $y \in H_1(v)$. Now, y can inform the Base Station directly or relay its ID via v. This allows the Base Station to compute the 3-hop minimum distance paths between such nodes in $CTG_3$ sub-graph.

An illustrative application of the invention methodology is hereafter described.

Given a set of nodes N in the entire network, the Base Station can compute the density $\rho$ of mobiles knowing the geographic spread of the network (i.e., the inhabitable spread). The Base Station can add a safety margin for this density by, for example, multiplying it by a factor of 3. Given this, the Base Station computes the expected number of users m in a 2-hop neighborhood as no more than $m_2 = \pi 2^2 * 3\rho = 37\rho$. In a 1-hop neighborhood, the expected number of users will be less than $m_1 = \pi * 3\rho = 9.42\rho$.

For the $Z_0$ phase, the Base Station sets $W = 3 * m_1$, while for the $Z_1$, $Z_2$ phases, it sets $k = 2.08 * m_2 \ln(N/\epsilon)$, where $\epsilon = 0.001$.

Phase $Z_0$ lasts W slots, where each slot is the same length as a back-off slot in 802.11, i.e., 20 µs. Phase $Z_2$ lasts for the duration of transmission of k data symbols. For IEEE 802.11a/g, the symbol time is 10 µs, regardless of the bit-rate used if there is only one symbol in the entire data frame. The Phase $Z_1$ length can vary depending on the type of sub-graph requested. If only $CTG_2$ is required, then $Z_1$ lasts for k data symbols, with no Phase $Z_3$ following it. However, if $CTG_3$ is requested, then each slot in the $Z_1$ phase lasts SIFS+data symbol duration, which is 20 µs in 802.11a/g.

Therefore, using 802.11a/g radios, discovering $CTG_2$ takes (20W+10k) µs, and discovering $CTG_3$ takes (20W+20k+10k) pis. If one assumes N users spread over 10 km$^2$, the values of W; k, d as well as the topology discovery times for $CTG_2$ and $CTG_3$ for various node densities are shown in Table I assuming that the Wi-Fi range of a mobile is 100 meters. In the table, W, d, k are in slots, while the time taken for discovering $CTG_2$ and $CTG_3$ ($T_2$; $T_3$ respectively) is in milliseconds.

TABLE 1

| $\rho$ | N | $m_1$ | W | k | d | $T_2$ | $T_3$ |
|---|---|---|---|---|---|---|---|
| 1 | 318 | 9 | 28 | 976 | 18 | 10.32 | 29.84 |
| 2 | 636 | 18 | 56 | 2058 | 19 | 21.70 | 62.86 |
| 3 | 955 | 28 | 84 | 3182 | 19 | 33.50 | 97.14 |
| 4 | 1273 | 37 | 113 | 4331 | 20 | 45.57 | 132.19 |
| 5 | 1592 | 47 | 141 | 5500 | 20 | 57.82 | 167.82 |
| 6 | 1910 | 56 | 169 | 6684 | 20 | 70.22 | 203.90 |
| 7 | 2229 | 65 | 197 | 7882 | 21 | 82.76 | 240.40 |
| 8 | 2547 | 75 | 226 | 9090 | 21 | 95.42 | 277.22 |
| 9 | 2866 | 84 | 254 | 10308 | 21 | 108.16 | 314.32 |
| 10 | 3184 | 94 | 282 | 11534 | 21 | 120.98 | 351.66 |

Even with a very high node density $\rho = 10$, the size of the $\psi_1$ and $\psi_2$ digests is only k<12000 bits, which is 1500 bytes. Thus, each CH sends at most two 1500-byte packets to the Base Station to assist in topology discovery for 3000 nodes, i.e., less than 1-byte per node present. The time taken for discovering the topologies is primarily a function of $\rho$, and does not change much even when a larger area is considered (i.e., larger N).

The CHs use the uplink data channels to send this information to the Base Station. This implies that there is a small delay (roughly 100 ms in LTE) in acquiring the bearer channels by each CH node. While a CH is transmitting on the bearer channel, the other CHs can attempt to acquire the data channel in parallel by contending on the uplink control channel, thereby reducing the bearer acquisition overhead. The advantage here is that of only a small number of nodes transmitting to the Base Station, which reduces the overall overhead.

Finally, it is important to note again that during the entire process, no node ever transmits any identifying information over the Wi-Fi interface. Thus, any eavesdropper or even other participating mobiles will never know the identity of any mobile in the network. Only the Base Station will be able to identify all the nodes in the network, and can choose to communicate it as needed to the mobiles. This guarantee of anonymity is a unique aspect of the invention methodology.

Herein, the inventors have disclosed a system and method for an improved compact topology graph determination for a network of mobile terminals having a capability of inter-nodal communication. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system for determining a network topology among a plurality of mobile nodes forming a cluster and having a common communication link to a base station, each mobile node having a unique identity, the method comprising:

causing at least one of the mobile nodes to transmit a signal during a transmission slot, the at least one node thereby becoming a cluster head (CH);

selecting, at mobile nodes other than the CH (hereafter "non-CH nodes"), one or more transmission intervals in a transmission frame;

causing ones of the non-CH nodes to transmit a signal during the selected interval for given non-CH nodes;

forming, by the CH, a first digest of transmitted signals received from non-CH nodes according to the transmission interval in which at least one signal is received;

constructing a compact topology graph for the node cluster as a function of the digest, a node identity for the CH and the transmission slot in which the CH signal was transmitted.

2. The method of claim 1 wherein ones of the non-CH nodes
   (1) detect transmitted signals from other non-CH nodes in a sequence of transmission intervals;
   (2) upon detection of signals transmitted over the transmission frame, record a presence or absence of at least one transmitted signal in transmission intervals of the frame as a vector; and
   (3) transmits the vector to the CH.

3. The method of claim 1 wherein the forming by the CH of a first digest further comprises logging, as a binary vector, a presence or absence of a signal transmitted from ones of the non-CH nodes during each of the transmission intervals in the transmission frame.

4. The method of claim 1 wherein the selection of transmission intervals by the non-CH nodes is carried out in a manner to assure that at least one of the transmission intervals selected by ones of the non-CH nodes is free of collisions from other transmitting non-CH nodes.

5. The method of claim 1 wherein construction of the compact topology graph is implemented by the base station based on transmission from the CH of the digest, a node identity for the CH and the transmission intervals in which the CH signal was transmitted.

6. The method of claim 1 wherein privacy of node identification is maintained by limiting communication of node identity to only transactions with the base station.

7. A method in a wireless communication system for determining a network topology among a plurality of mobile nodes forming a cluster and having a common communication link to a base station, each mobile node having a unique identity, the method comprising:

causing at least one of the mobile nodes to transmit a signal during a transmission slot, the at least one node thereby becoming a cluster head (CH),
   wherein each mobile node other than the CH (hereafter "non-CH node") is configured to select one or more transmission intervals in a transmission frame, and wherein each non-CH node is further configured to transmit a signal during its selected interval; and
   wherein the CH forms a first digest of transmitted signals received from non-CH nodes according to the transmission interval in which at least one signal is received; and constructing a compact topology graph for the node cluster as a function of the digest, a node identity for the CH and the transmission slot in which the CH signal was transmitted.

8. The method of claim 7 wherein ones of the non-CH nodes
   (1) detect transmitted signals from other non-CH nodes in a sequence of transmission intervals;
   (2) upon detection of signals transmitted over the transmission frame, record a presence or absence of at least one transmitted signal in transmission intervals of the frame as a vector; and
   (3) transmits the vector to the CH.

9. The method of claim 8 wherein the CH forms a second digest of transmitted signals according to the transmission interval in which a given signal is detected based on the vectors transmitted by the non-CH nodes.

10. The method of claim 9 further comprising constructing a second compact topology graph as a function of the first and second digests, a node identity for the CH and the transmission intervals in which the CH signal was transmitted.

11. The method of claim 8 wherein ones of the non-CH nodes determine the presence or absence of a transmitted signal in a given transmission interval as a function of received signal energy relative to a predetermined threshold value.

12. The method of claim 7 wherein the forming by the CH of a first digest further comprises logging, as a binary vector, a presence or absence of a signal transmitted from ones of the non-CH nodes during each of the transmission intervals in the transmission frame.

13. The method of claim 12 wherein the CH determines the presence or absence of a transmitted signal in a given transmission interval as a function of received signal energy relative to a predetermined threshold value.

14. The method of claim 7 wherein the selection of transmission intervals by the non-CH nodes is carried out in a manner to assure that at least one of the transmission intervals selected by ones of the non-CH nodes is free of collisions from other transmitting non-CH nodes.

15. The method of claim 14 further wherein each of the non-CH nodes transmits in up to d transmission intervals in a window of length k transmission intervals, where k and d are integral values provided by the base station.

16. The method of claim 15 wherein a determination by a given non-CH node of the up-to d transmission intervals in which it will transmit is based on a random hash of a seed value and an identification indicia for the given non-CH node, where the seed value is provided to the non-CH node by the base station.

17. The method of claim 7 wherein construction of the compact topology graph is implemented by the base station based on transmission from the CH of the digest, a node identity for the CH and the transmission intervals in which the CH signal was transmitted.

18. The method of claim 7 wherein privacy of node identification is maintained by limiting communication of node identity to only transactions with the base station.

19. A method in a wireless communication system for determining a network topology among a plurality of mobile nodes forming a cluster and having a common communication link to a base station, each mobile node having a unique identity, the method comprising:

transmitting during a transmission slot a signal by one of the mobile nodes, the one mobile node thereby becoming a cluster head (CH);

receiving from each of a remaining plurality of mobile nodes other than the CH (hereafter "non-CH nodes) a signal during one or more transmission intervals in a transmission frame;

forming, by the CH, a first digest of transmitted signals received from the non-CH nodes according to the transmission intervals in which the signals are received;

transmitting to a base station the digest, a node identity for the CH and the transmission slot in which the CH signal was transmitted.

20. The method of claim 19 wherein the forming by the CH of a first digest further comprises logging, as a binary vector, a presence or absence of a signal transmitted from ones of the non-CH nodes during each of the transmission intervals in the transmission frame.

\* \* \* \* \*